US008624710B2

United States Patent
Nelson et al.

(10) Patent No.: US 8,624,710 B2
(45) Date of Patent: Jan. 7, 2014

(54) SYSTEM AND METHOD FOR INTERROGATION RADIO-FREQUENCY IDENTIFICATION

(75) Inventors: Christopher J. Nelson, Cupertino, CA (US); Scott E. Lindley, Redwood City, CA (US)

(73) Assignee: Farpointe Data, Inc., Sunnyvale, CA (US)

( * ) Notice: Subject to any disclaimer, the term of this patent is extended or adjusted under 35 U.S.C. 154(b) by 844 days.

(21) Appl. No.: 11/893,678

(22) Filed: Aug. 16, 2007

(65) Prior Publication Data

US 2009/0045913 A1 Feb. 19, 2009

(51) Int. Cl.
*H04Q 5/22* (2006.01)
(52) U.S. Cl.
USPC .......................................... 340/10.3; 340/5.61
(58) Field of Classification Search
USPC .......................................... 340/10.3; 235/451
See application file for complete search history.

(56) References Cited

U.S. PATENT DOCUMENTS

| | | |
|---|---|---|
| 4,333,072 A | 6/1982 | Beigel |
| 4,425,645 A | 1/1984 | Weaver et al. |
| 4,519,068 A | 5/1985 | Krebs et al. |
| 5,041,826 A | 8/1991 | Milheiser |
| 5,050,150 A | 9/1991 | Ikeda |
| 5,343,469 A | 8/1994 | Ohshima |
| 5,347,263 A | 9/1994 | Carroll et al. |
| 5,594,384 A | 1/1997 | Carroll et al. |
| 5,600,683 A | 2/1997 | Bierach et al. |
| 5,909,462 A | 6/1999 | Kamerman et al. |
| 5,952,935 A | 9/1999 | Mejia et al. |
| 6,154,136 A | 11/2000 | Van Eeden |
| 6,212,175 B1 | 4/2001 | Harsch |
| 6,285,681 B1 | 9/2001 | Kolze et al. |
| 6,307,517 B1 | 10/2001 | Lee |
| 6,367,697 B1 * | 4/2002 | Turner et al. .................. 235/440 |
| 6,369,693 B1 * | 4/2002 | Gibson .......................... 340/5.8 |
| 6,377,176 B1 | 4/2002 | Lee |
| 6,411,199 B1 * | 6/2002 | Geiszler et al. .............. 340/10.1 |

(Continued)

FOREIGN PATENT DOCUMENTS

JP 2004227314 8/2004
WO 02/41650 A1 5/2002

(Continued)

OTHER PUBLICATIONS

International Search Report and Written Opinion for International Application No. PCT/EP2008/071072 (Oct. 27, 2008).

(Continued)

*Primary Examiner* — Brian Zimmerman
*Assistant Examiner* — Omer S Khan
(74) *Attorney, Agent, or Firm* — Nixon Peabody LLP (57) ABSTRACT

A system and method for communicating with contactless IC cards of multiple protocols and power levels includes generating a first alternating magnetic field with an interrogator for energizing a proximate IC card and receiving a data transmission from the IC card. A processor of the interrogator is configured to decode the received data transmission. The interrogator then generates a second alternating magnetic field having a different magnetic field strength than the first alternating magnetic field when failing to decode the data transmission being received from the IC card. The processor then attempts to decode a data transmission received from the IC card in response to the second alternating magnetic field.

4 Claims, 7 Drawing Sheets

(56) References Cited

U.S. PATENT DOCUMENTS

| | | | |
|---|---|---|---|
| 6,963,270 | B1 | 11/2005 | Gallagher, III et al. |
| 7,652,556 | B2 | 1/2010 | Breitfuss et al. |
| 2004/0202113 | A1* | 10/2004 | Moon et al. .................. 370/252 |
| 2004/0203462 | A1* | 10/2004 | Lin et al. .................... 455/67.13 |
| 2005/0156709 | A1 | 7/2005 | Gilbert et al. |
| 2005/0156723 | A1 | 7/2005 | Fujii |
| 2006/0117066 | A1 | 6/2006 | Smith et al. |
| 2006/0119470 | A1 | 6/2006 | Breitfuss et al. |
| 2006/0125605 | A1 | 6/2006 | Fischer et al. |
| 2006/0176152 | A1* | 8/2006 | Wagner et al. ............... 340/10.2 |
| 2006/0220790 | A1 | 10/2006 | Doi et al. |
| 2006/0220791 | A1 | 10/2006 | Willins et al. |
| 2006/0289649 | A1* | 12/2006 | Sugiura et al. ............... 235/451 |
| 2007/0018793 | A1* | 1/2007 | Stewart et al. .............. 340/10.3 |
| 2007/0096876 | A1 | 5/2007 | Bridgelall et al. |
| 2008/0061936 | A1 | 3/2008 | Park |
| 2008/0068174 | A1* | 3/2008 | Al-Mahdawi .............. 340/572.7 |
| 2008/0100439 | A1* | 5/2008 | Rinkes ....................... 340/572.1 |
| 2008/0204194 | A1 | 8/2008 | Haar et al. |
| 2009/0002176 | A1* | 1/2009 | Bekritstky et al. ......... 340/572.7 |
| 2009/0045913 | A1* | 2/2009 | Nelson et al. ............... 340/5.66 |
| 2009/0045923 | A1 | 2/2009 | van Eeden |

FOREIGN PATENT DOCUMENTS

| | | |
|---|---|---|
| WO | 2004/063971 A1 | 7/2004 |
| WO | 2006/104338 A1 | 10/2006 |
| WO | 2006/109212 A1 | 10/2006 |

OTHER PUBLICATIONS

International Search Report and Written Opinion for International Application No. PCT/EP2008/071084 (Nov. 18, 2008).

van Eeden, Hendrick, "'Reader Talks First' vs. 'Tag Talks First' RFID protocols", white paper, retrieved from the internet URL: http://www.ipico.co.za/technology/Whitepapers/TTF%20white%20paper%20V5.pdf (Aug. 26, 2002).

Beigel, Michael L., "Objective Measurements for RF-ID System Performance: System Design and Evaluation Criteria", (Jan. 16, 1993).

Motorola Indala Corporation, "Installation and Operation Instructions", PR-10 Manual (Jul. 8, 1994).

SWATCH Datasheet, "Read-Only Contactless Identification Device", EM Microelectronic-Marin SA (Mar. 1996).

SIA, "Access Control Standard Protocol for the 26-BIT Weigand™ Reader Interface" (Oct. 17, 1996).

Motorola, "RFID: Everything You Need to Know" (Nov. 11, 1997).

Microchip AN678, "RFID Coil Design", © Microchip Technology Inc. (Jan. 1, 1998).

1 Microchip AN680, "Passive RFID Basics", Microchip Technology Inc. (Jan. 1, 1998).

Microchip, "FSK Reader Reference Design", Microchip Technology Inc. (Jan. 1, 1998).

Beigel, Michael L., "Dynamic Performance of Passive-Tag Inductive RFID Systems", Transponder News (Feb. 21, 1999).

Motorola, "The ProxSmith™ System User Manual" (Apr. 15, 1999).

Microchip MCRF250 Data Sheet, "125 kHz microID® Passive RFID Device with Anti-Collision" (2005).

Microchip White Paper, "microID™ 125 kHz RFID System Design Guide" (Dec. 1998).

Wikipedia, definition of "Checksum", URL: http://en.wikipedia.org/wiki/Checksum (2008).

©IDTechEx White Paper, "RFID Explained", Website: www.idtechex.com (2005).

Fukumizu, Yohei et al., "Communication Scheme for a Highly Collision-Resistive RFID System", IEICE Trans. Fundamentals, vol. E89-A, No. 2, pp. 408-415, Feb. 2006.

Kobayashi, Shinsuke et al., "A Dynamic Retargettable Multi-Protocol RFID Reader/ Writer", 21st International Conference on Advanced Information Networking and Applications Workshop (AINAW'07), 2007.

Office Action in U.S. Appl. No. 11/893,679, mailed Sep. 27, 2010.
Office Action in U.S. Appl. No. 11/893,679, mailed Feb. 15, 2011.
Office Action in U.S. Appl. No. 11/893,679, mailed Jul. 28, 2011.
Office Action in U.S. Appl. No. 11/893,679, mailed Mar. 16, 2012.
Office Action in U.S. Appl. No. 11/893,679, mailed Jul. 20, 2012.
Notice of Allowance in U.S. Appl. No. 11/893,679, mailed Nov. 26, 2012.

* cited by examiner

SYSTEM AND METHOD FOR INTERROGATION RADIO-FREQUENCY IDENTIFICATION

STATEMENT OF RELATED APPLICATIONS

The present application may be considered to be related to U.S. patent application Ser. No. 11/893,679 filed on Aug. 16, 2007, now U.S. Pat. No. 8,411,764, in the name of inventors Christopher J. Nelson and Kirk B. Bierach, entitled "System And Method For Multi-Protocol Radio-Frequency Identification", commonly owned herewith.

TECHNICAL FIELD

The present disclosure relates generally to radio-frequency identification (RFID) technology and more specifically to an RFID interrogator.

BACKGROUND

The development of RFID systems has been fueled by advances in integrated circuit (IC) technology, which enables significant miniaturization of electronic devices, and recent growth in the popularity of wireless communications, which provides a secure and reliable way for transferring information using RF signals. Typically, an RFID system includes an RFID interrogator (or reader) and one or more RFID tags (or contactless IC cards). In operation, the RFID interrogator generates an alternating magnetic field, which induces electric current in a proximate RFID tag. The induced electric current provides enough power to the RFID tag to transmit a response signal to the RFID interrogator.

Due to relative simplicity and low cost of manufacturing, RFID systems have gained a widespread application. For example, RFID technology is commonly used for personal authentication in passports and other forms of ID. In the transportation sector, RFID cards are used to pay for the use of public transportation and highways. In the retail environment, RFID tags are used for product tracking. In the banking industry, RFID technology is embedded in debit and credit cards. In security applications, RFID cards are used to access secure areas or services. In medicine, RFID technology is used in human implants to monitor various health conditions, monitor prescribed drugs and the like.

The growing demand for RFID products has resulted in development of numerous proprietary and non-proprietary RFID technologies. The proprietary nature of some of these technologies often makes them incompatible with each other. For example, RFID systems manufactured by different vendors may use custom communication protocols and data formats and have different power requirements. Despite industry-wide efforts to standardize RFID technologies, there remain numerous incompatible RFID systems. Accordingly, there is a need for an RFID interrogator interoperable with various RFID tags, which may have different protocols, data formats and power requirements.

OVERVIEW

Disclosed are a radio-frequency identification method and system interoperable with disparate RFID communication protocols, data formats and power requirements. In one example embodiment, an IC card reader, such as RFID interrogator, includes a transmitter configured to generate an alternating magnetic field for energizing one or more proximate IC cards and transmit an IC card polling signal. The first alternating magnetic field may correspond to a first output power level. The IC card reader further includes a receiver configured to receive a data transmission from a proximate IC card. The IC card reader further includes a processor configured to attempt to decode in real-time the detected data transmission and generate a control signal when failing to decode the data transmission. In response to the control signal, the transmitter configured to generate a second alternating magnetic field having a different magnetic field strength than the first alternating magnetic field, wherein the second alternating magnetic field corresponds to a second output power level. In one embodiment, the first alternating magnetic field is stronger than the second alternating magnetic field. In another embodiment, the first alternating magnetic field is weaker than the second alternating magnetic field.

In one example embodiment, the processor may be further configured to repeatedly alternate generation of a control signal thereby alternating generation of the first alternating magnetic field and the second alternating magnetic field and attempt to decode data transmissions received from one or more IC cards following generation of each alternating magnetic field. The processor may be further configured to compute the number of decoded data transmissions following the first alternating magnetic fields, and compute the number of data transmission decoded following the second alternating magnetic fields. The processor may be further configured to adjust a duration of the first output power level and a duration of the second output power level as a function of one of (i) the number of decoded data transmissions following the first alternating magnetic fields and (ii) the number of decoded data transmission following the second alternating magnetic fields.

Another example embodiment relates to a method for communicating with contactless IC cards. The method includes generating a first alternating magnetic field for energizing a proximate IC card and receiving a data transmission from a proximate IC card. The method further includes attempting to decode the data transmission being received from the IC card. When failing to decode the data transmission being received from the IC card, generating a second alternating magnetic field having a different magnetic field strength than the first alternating magnetic field and again attempting to decode a data transmission being received from the IC card. In one embodiment, the first alternating magnetic field is stronger than the second alternating magnetic field. In another embodiment, the first alternating magnetic field is weaker than the second alternating magnetic field.

The method may further include repeatedly alternating generation of the first alternating magnetic field and the second alternating magnetic field and attempting to decode data transmissions received from one or more IC cards following generation of each alternating magnetic field. The method may further include computing the number of decoded data transmissions following the first alternating magnetic fields, and computing the number of data transmission decoded following the second alternating magnetic fields. The method may further include adjusting a duration of the first output power level and a duration of the second output power level as a function of one of (i) the number of decoded data transmissions following the first alternating magnetic fields and (ii) the number of decoded data transmission following the second alternating magnetic fields.

Another example embodiment relates to a method for communicating with contactless IC cards. The method includes generating a first alternating magnetic field for energizing a proximate IC card and transmitting an IC card polling signal. The method further receiving a data transmission from a proximate IC card and determining whether or not the data transmission is being received in response to the polling signal. When the data transmission is being received in response to the polling signal, attempting to decode the data transmission being received. When failing to decode the data transmission being received, generating a second alternating magnetic field having a different magnetic field strength than the first alternating magnetic field.

The method may further include attempting to decode a data transmission being received from the proximate IC card following generation of the second alternating magnetic field. The method may further include determining whether the data transmission being received before or after expiration of a predetermined time period following transmission of the polling signal. The method may further include storing the received data transmission in a memory and decoding the stored data transmission when the data transmission is not being received in response to the polling signal. The format of the data transmission may be determined by determining whether the data transmission includes one or more start bits, determining whether the data transmission includes one or more parity bits, and/or determining whether the data transmission includes one or more cyclic redundancy check (CRC) bits.

In yet another embodiment a computer-readable medium comprising computer-executable instructions for configuring operation of a contactless IC card interrogator includes instructions for selecting a first output power level of the IC card interrogator and selecting a second output power level of the IC card interrogator when the IC card interrogator fails to decode one or more data transmissions from a proximate IC card. The computer-executable instructions may further include instructions for selecting a duration of the first output power level and a duration of the second output power level.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of an RFID communication system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings.

The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
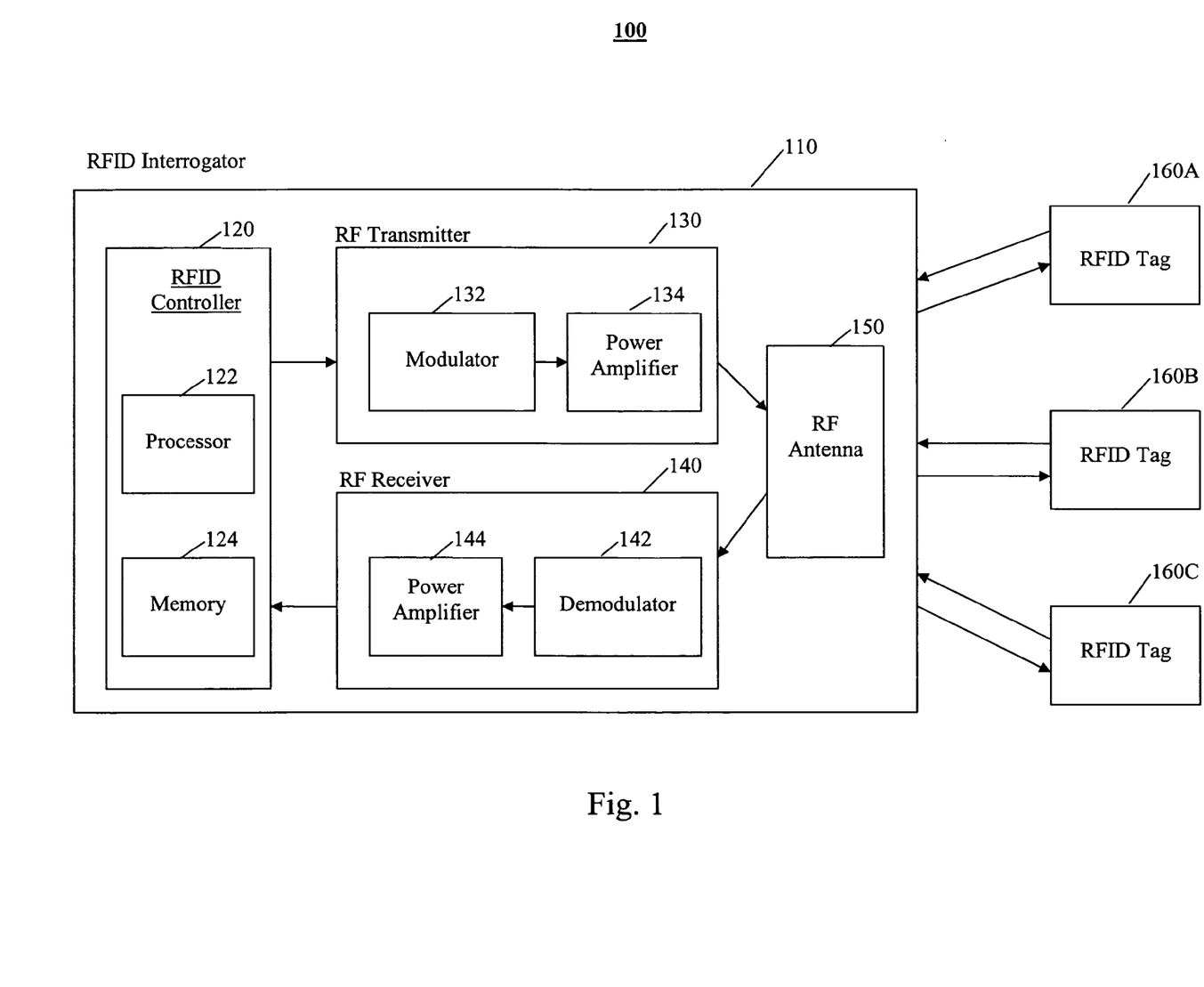
FIG. 1 is a block diagram illustrating an example embodiment of an RFID system.

Turning now to FIG. 1, a block diagram illustrating one example embodiment of an RFID system 100 is shown. The RFID system 100 includes RFID interrogator 110 and a plurality of RFID tags 160 (160A, 160B, 160C). The RFID interrogators 110 includes an RFID controller 120, which includes a processor 122 and memory 124. The interrogator 110 further includes RF transmitter 130, which includes a modulator 132 and power amplifier 134. The interrogator 110 further includes an RF receiver 140, which includes a demodulator 142 and power amplifier 144. The interrogator further includes one or more RF antennas 150. The diagram has been simplified to include primarily elements of the system 100 that will be relevant to the discussion that follows. Those of ordinary skill in the art will readily identify other elements that might also be included as desired or required. The various elements may be also separated, combined or reordered as desired or required. Other means of implementing the interrogator are also known to those of skill in the art and are not intended to be excluded.

In one example embodiment, an interrogator 110 includes an RFID controller 120, which controls operation of various components of interrogator 110, such as transmitter 130 and receiver 140. Controller 120 may be configured to select an operating mode of the interrogator 110, determine an output power level of transmitted RF signals, decode data transmissions received from the RFID tags 160, and perform other functions known to those of ordinary skill in the art. In one example embodiment, controller 120 may be implemented as a 8-bit PIC® programmable microcontroller (available from Microchip Technology, Inc. of Chandler, Ariz.). In alternative embodiments, controller 120 may be implemented at least in part with a general purpose microprocessor, a field programmable gate array, an application specific integrated circuit (ASIC) or the like.

In one example embodiment, controller 120 includes a processor 122 and a memory 124. Processor 122 may store and execute program logic for operating various components of the interrogator 110, decoding data transmissions received from various RFID tags 160, performing arithmetic and logic operations and other functions. The processor 122 is coupled to memory 124 (which may be implemented as on-board memory), which may be used to store executable program instructions and other data for use by processor 122 during decoding of RFID information. Memory 124 may include volatile or non-volatile program memory, such as ROM (Read Only Memory), PROM (Programmable Read Only Memory), EEPROM (Electrically Erasable Programmable Read Only Memory), FLASH memory, and other types of magnetic and optical storage media for storing RFID information and other data.

In one example embodiment, interrogator 110 includes a RF transmitter 130, which is operable to receive digital data from processor 122, modulate the receive data using modulator 132, amplify the modulated signal using power amplifier 134 and route the amplified RF signal to antenna 150. In addition, transmitter 130 is configured to generate alternating magnetic field for energizing IC cards proximate to the interrogator 110. Modulator 132 may be configured to receive a data bit sequence from processor 122 and modulate a receive bit sequence on a carrier signal. The carrier signal may be generated by an oscillator (not shown) and have 13.56 MHz frequence in compliance with ISO/IEC 14443 standard for contactless IC cards. Other frequencies may be used, if desired. Modulator 132 may be configured to use one or more of the various known signal modulation techniques, including amplitude modulation (such as Manchester or QAM (Quadrature Amplitude Modulation) modulation), frequency modulation (such as FSK (Frequency-Shift Keying) modulation), or phase modulation (such as PSK (Phase-Shift Keying) modulation) and variants thereof.

RF transmitter 130 may further include a power amplifier 134 for amplifying a modulated data signal and routing it to the antenna 150, which radiates the amplified signal to proximate RFID tags. In one example embodiment, controller 120 may control an output power level of amplifier 134. To that end, power amplifier 134 may be implemented as a multi-stage variable power amplifier, which may (in response to a control signal from RFID controller 120) increase/decrease its output power level by turning on/off one or more of its amplification stages. In alternative embodiments, the transmitter 130 may use other variable-power amplification techniques known to those skilled in the art. In one example embodiment, amplifier 134 may vary its output power level from 3.5 A/m to 12.5 A/m in 0.5 A/m increments. The desired output power range may be selected based on specific power requirements of one or more RFID tags.

In one example embodiment, interrogator 110 includes an RF receiver 140, which is configured to receive data transmissions from antenna 150, demodulate the received data using demodulator 142, amplify the demodulated digital data signal using power amplifier 144 and route the amplified signal to processor 122 for decoding. To demodulate a signal, demodulator 132 may use a PLL (Phase Lock Loop) (not shown) and a reference signal generated by an oscillator (not shown) to synchronise itself with the incoming data transmission and extract a digital data signal from the carrier signal. Furthermore, demodulator 132 needs to know the modulation type of the incoming data transmission, which, in most cases, will be identical to the modulation type used by the transmitter 132. The demodulated data signal is amplified and routed to processor 122.

In one example embodiment, interrogator 110 includes one or more RF antennas 150 for transmitting and receiving RF signals. In one example embodiment, antenna 150 may be implemented as a single mono-static RF antenna, which may transmit a signal coming from transmitter 130 as well as receive a signal coming from a RFID tag 160. Switching between transmitting and receiving modes may require use of a circulator (not shown) that multiplexes the received and transmitted signals through a single port. In another example embodiment, antenna 150 may be implemented as a bi-static antenna, including two antennas, where one antenna is dedicated to transmitting, and the other antenna is dedicated to receiving. Use of a bi-static antenna can improve the sensitivity of antenna 150, thereby improving the performance of interrogator 110.

In one example embodiment, RFID interrogator 110 has two operating modes: reader talk first (RTF) mode and tag talk first (TTF) mode. In the RTF mode, the interrogator 110 initiates a communication session with an RFID tag by transmitting a polling signal, which may be detected by RTF tags 160 located in the proximity of interrogator 110. RFID tag 160 may process the received polling signal and respond to the interrogator 110 with a response data transmission. In the TTF mode, an RFID tag 160 initiates a communication session when placed in proximity of interrogator 110 by either sending a beacon signal or starting the actual data transmission. In this mode, interrogator 110 listens for any signals detected at the receiver 140. When a data transmission is detected from a TTF tag 160, interrogator 110 attempts to decode it using methods described hereinbelow. The interrogator 110 may periodically alternate between the two operating modes, thereby managing to read different types of RFID tags.

In one example embodiment, interrogator 110 may use different methods for decoding RTF and TTF data transmissions. RTF transmissions may be decoded in real-time, because interrogator 110 may know the format of the data transmission in advance. In particular, an RTF data transmission is send by the RTF tag 160 in response to a polling signal transmitted by the interrogator 110. The polling signal may contain information about communication protocol utilized by the interrogator 110, such as a version number of the communication protocol, vendor information, data format information and the like. In this way, the RTF tag knows how to format its response data transmission, so it can be decoded by interrogator 110 on the fly. In contrast, TTF transmissions are initiated by RFID tags 160 and thus cannot be decoded in real-time because the format of the data transmission is not known to interrogator 110 in advance. To that end, the interrogator 110 stores the entire TTF data transmission in memory 124 and only then begins decoding of the stored data transmission, as discussed herein below.

Figure 2:
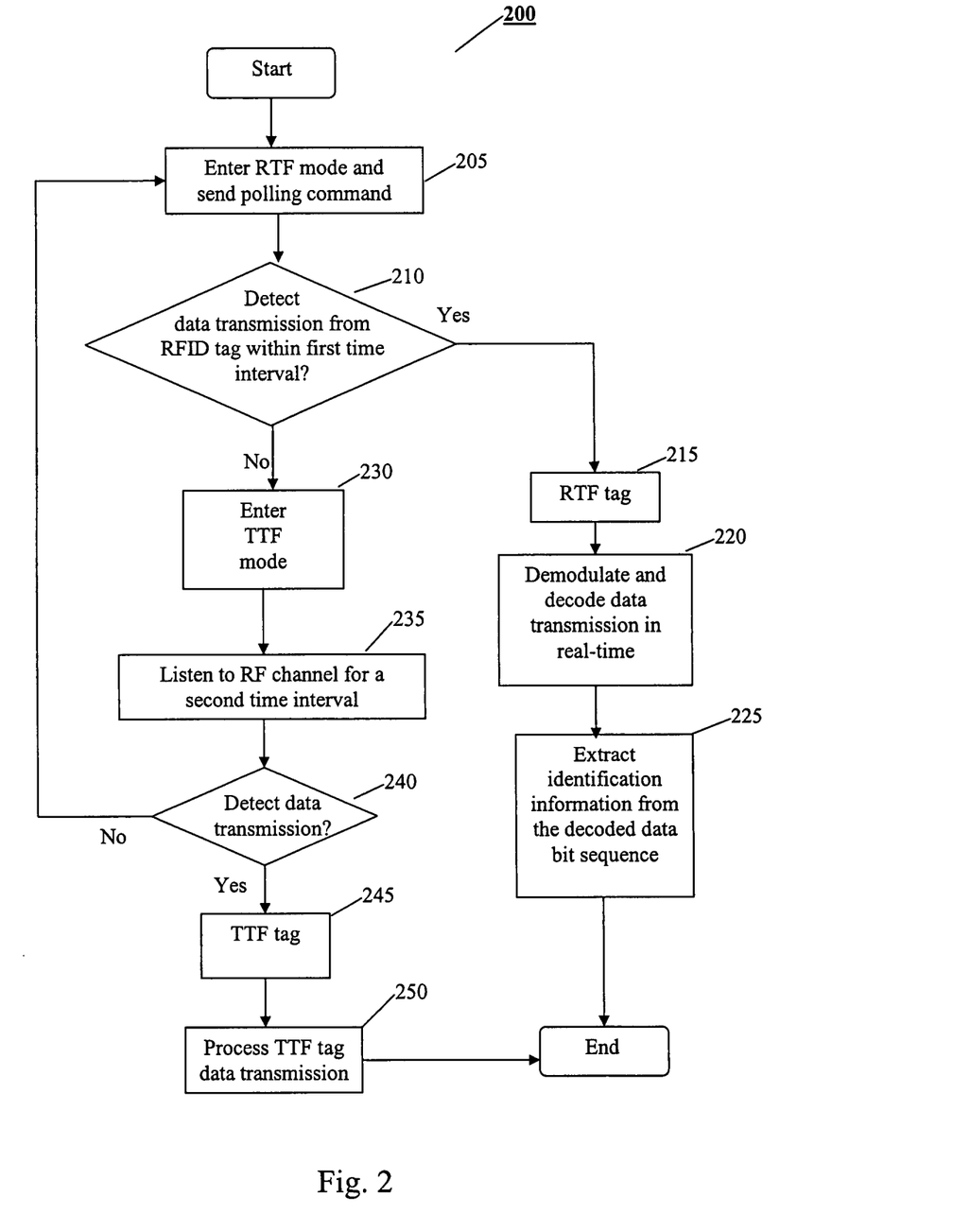
FIG. 2 is a flow diagram illustrating an example embodiment of an RFID interrogation process having RTF and TTF operating modes.

Turning now to FIG. 2, an example embodiment of an RFID interrogation process 200 is illustrated in a flow diagram. At step 205, RFID interrogator enters RTF mode and sends a polling command. At step 210, the interrogator listens to a channel for a first predetermined period of time, which is sufficiently long to receive a response from a RTF tag located in the proximity of the RFID interrogator. In one example embodiment, the period of time may correspond to a frame delay time, which may vary between different communication standards. The International Standards Organization (ISO) has adopted standard ISO/IEC 14443-1:2000 entitled "Identification cards—Contactless integrated circuit(s) cards—Proximity cards" as amended by ISO/EEC 1443-2: 2001, ISO/IEC 14443-3:2001 and ISO/IEC 14443-4:2001. In accordance with that standard, which applies to many IC cards in use today, the ISO/IEC 14443 standard frame delay time is set to 91.1 microseconds. If a data transmission is received within the predetermined period of time, the RFID interrogator concludes that it comes in response to the polling command from a proximate RTF RFID tag, step 215. The interrogator then demodulates, amplifies and decodes in real time the data transmission being received, step 220. The processor then extracts identification information from the decoded bit sequence for further processing, step 225.

If no data transmission was received in the first predetermined time period, step 210, the RFID interrogator enters TTF mode, step 230. In the TTF mode, the interrogator listens to a channel for a second predetermined period of time, which may be arbitrarily selected by a system administrator. In one example embodiment, the TTF mode may last for 300 milliseconds, step 235. If no data transmission was received during the second predetermined time period, the RFID interrogator may switch back to the RTF mode, described above. If data transmission is detected during the second time period, the interrogator concludes that the data transmission is coming from TTF RFID tag, step 245. The interrogator then demodulates the received data transmission and stores it in memory for further processing using algorithms described hereinbelow, step 250.

In another example embodiment, interrogator 110 may be interoperable with different power types of RFID tags, such as RFID tags that require lower power and RFID tags that require higher power energizing alternating magnetic fields from the interrogator 110. For example, ISO/IEC 14443 standard limits the unmodulated field strength to between 1.5 A/m minimum and 7.5 A/m maximum. Some tags that use variants of the ISO/IEC 14443 standard may require alternating magnetic field of 12.5 A/m to function properly, while other tags may require magnetic field of 3.5 A/m only. Therefore, low-power RFID tags may be internally overdriven by interrogators having strong magnetic field and thus may be unreadable. In contrast, high-power RFID tags may not turn on properly, have insufficient read range, or have bit errors if not supplied with adequate power by the interrogator.

To accommodate different power type RFID tags, interrogator 110 may be configured to switch between different power levels by continuously adjusting its magnetic field strength until successful reading of a proximate RFID tag. In one example embodiment, interrogator may be set at low power level to generate alternating magnetic field of 3.5 A/m. If a tag 160 is read but errors are detected, the magnetic field strength may be increased in, for example, 0.5 A/m increments, by increasing transmitter's output power, until the read is successful. In another embodiment, interrogator 110 may be set to high power level to generate alternating magnetic field of 12.5 A/m. If a tag 160 is read but errors are detected, the magnetic field strength may be decreased by decreasing transmitter's output power until the read is successful. Yet in another embodiment, interrogator 110 may be configured to continuously sweep the output power from low to high to low in a periodic manner, thereby managing to communicate both with low and high power RFID tags.

In example embodiment, interrogator 110 may be configured to learn the power types of RFID tags that come in contact with the interrogator 110 and then adjust the duration of each output power level accordingly. For example, interrogator 110 may keep a running count of the number of RFID tags of each power type read during a predetermined time period and then dwell at a specific output power level more often than other power levels. Depending on the interrogator's magnetic field strength when the RFID tag read occurs, interrogator 110 may classify the tag as high or low power. For example, if the last 100 reads show 80 high power tags and 20 low power tags, the interrogator 110 may set the output power level bias towards high power tags, e.g. set dwell times to an 80% high power and 20% low power duty cycle. In another example, interrogator 110 may operate at high output power level and only decrease the output power when a data communication from a detected RFID tag has errors due to requirement for lower power from the interrogator 110.

Figure 3:
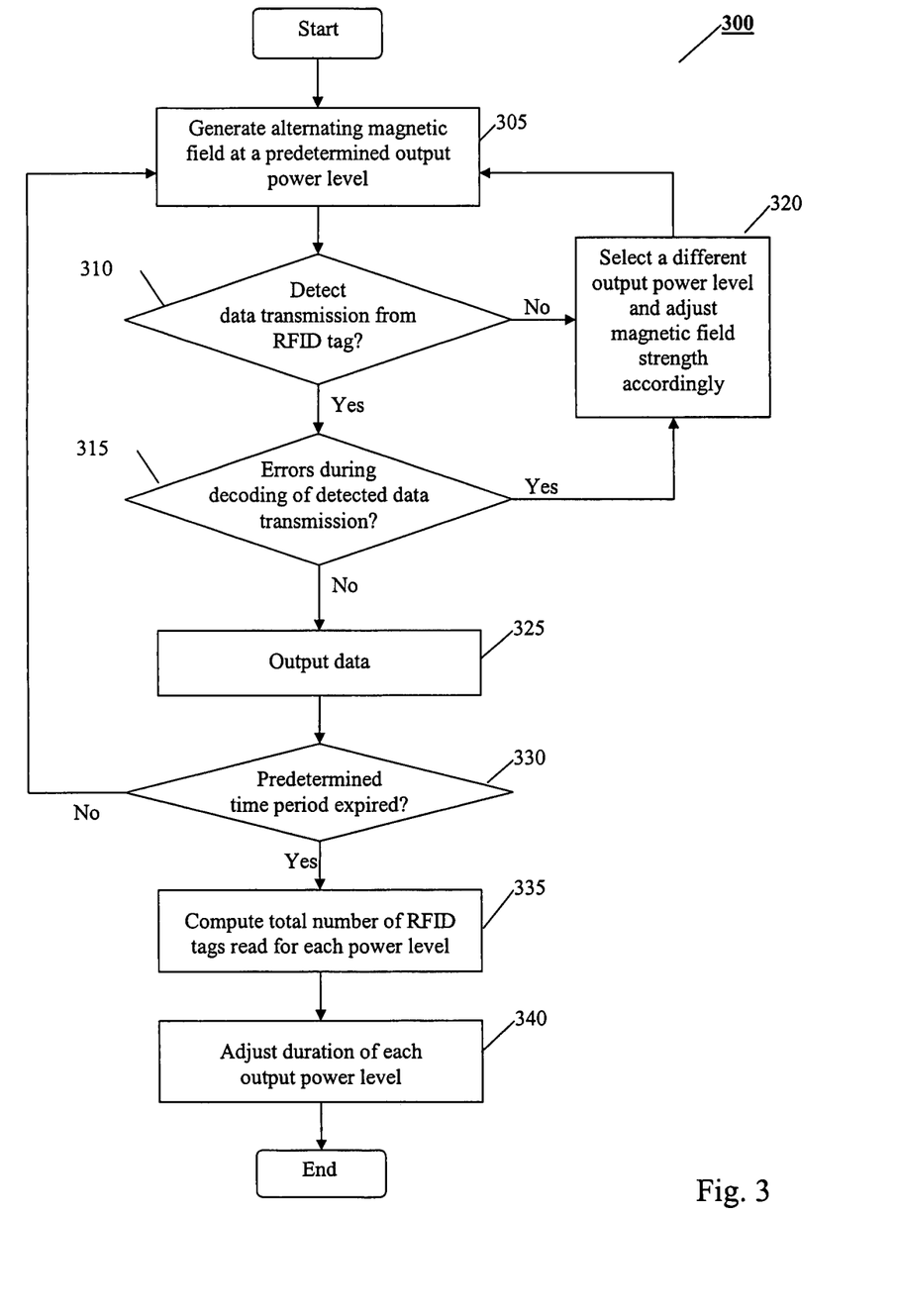
FIG. 3 is a flow diagram illustrating an example embodiment of an RFID interrogation process having multiple power levels.

Turning now to FIG. 3, an example embodiment of a variable output power RFID interrogation process is illustrated in a flow diagram. At step 305, interrogator 110 generates an alternating magnetic field having a predetermined magnetic field strength, e.g., 12.5 A/m. The interrogator listens for a predetermine time period, such as 91.1 microseconds, for data transmissions from proximate RFID tags, step 310. When a data transmission is detected, processor 122 attempts to decode the data transmission. If interrogator 110 fails to decode the data transmission due to one or more errors therein, step 315, the processor 122 may select another output power level, which may be higher or lower than the previous output power level, and send a control signal to RF transmitter 130 to adjust magnetic field strength accordingly, step 320. In response, transmitter 130 generates an alternating magnetic field having a different field strength, such as 7.5 m/A. Steps 305 through 320 may be repeated for a predetermined time period, a predetermine number of output power levels, or until a data transmission from a proximate RFID tag 160 is decoded and output for further processing, step 325.

Once a data transmission from an RFID tag is decoded and output for further processing, step 325, the interrogator may be configured to repeat the interrogation cycle in steps 305 through 325 for a predetermined period of time, step 330, predetermined number of interrogation cycles, or predetermined number of successful tag reads. During interrogation, the processor 122 may keep a running count of the number of RFID tags read at each power level, step 335. Once the total number of RFID tag read for each power level is computers, the processor may adjust duration of each output power level to correspond to the number of tags read at the given output power level. For example, if during 24 hour time interval, the interrogator read 80 high power tags and 20 low power tags, the interrogator 110 will set the output power level bias towards high power tags, e.g. set dwell times to an 80% high power and 20% low power duty cycle.

Figure 4:
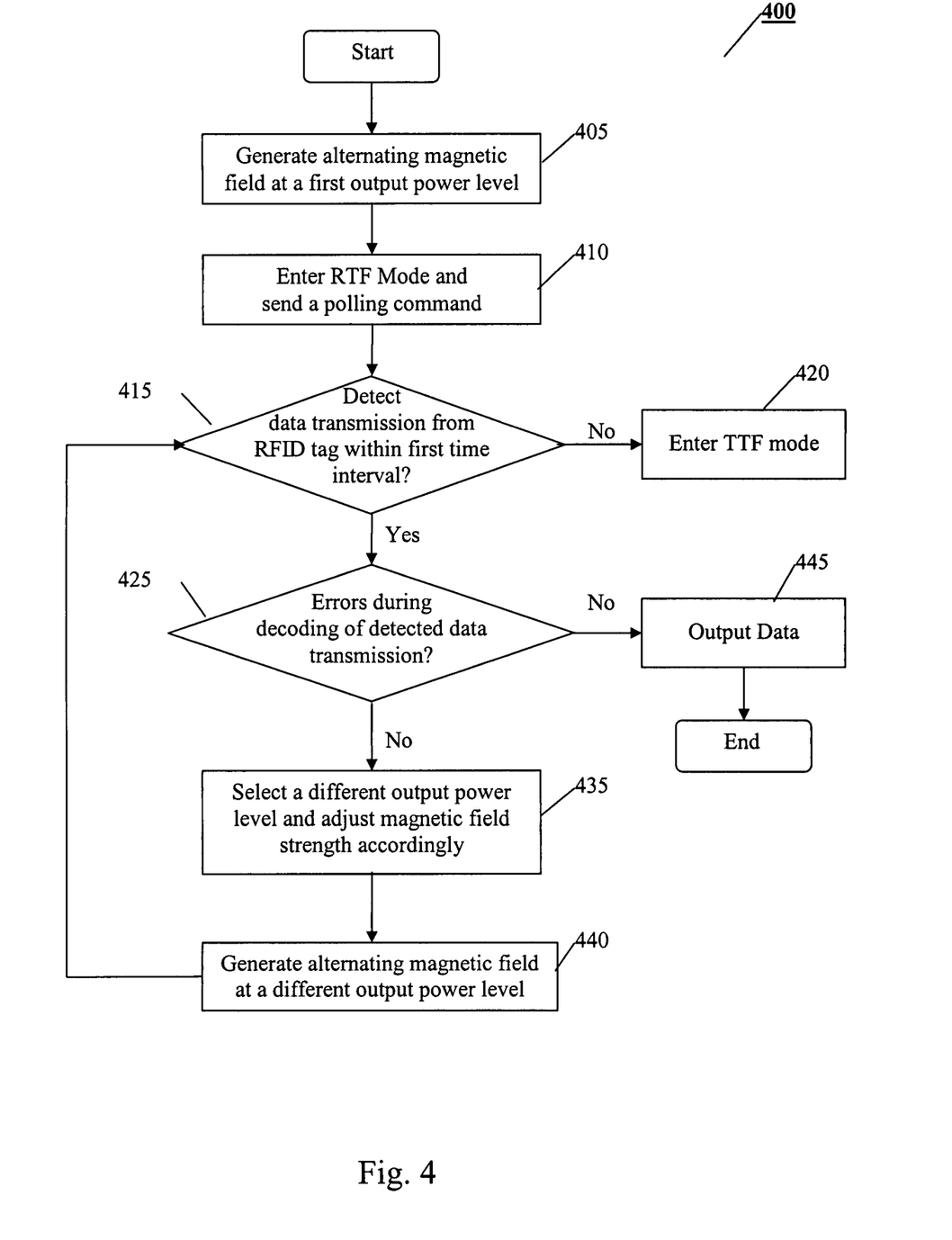
FIG. 4 is a flow diagram illustrating an example embodiment of an RFID interrogation process having combined RTF/TTF operating modes and multiple power levels.

In another example embodiment, interrogator 110 may be configured to operate at multiple power levels while supporting both TTF and RTF tags. FIG. 4 is a flow diagram of example embodiment of RFID interrogation process having combined multiple power levels and TTF/RTF capabilities. At step 405, interrogator 110 generates an alternating magnetic field having a predetermined magnetic field strength for energizing proximate RFID tags. The interrogator then enters RTF mode and sends a polling command, step 410. The interrogator then listens for a predetermined time period, such as 91.1 microseconds, for data transmissions from proximate RFID tags, step 415. If data transmission is detected during this time period, the interrogator may enter a TTF mode, step 420, and listen for a predetermined time period for data transmissions from TTF tags, as will be described in greater detail herein with reference to FIGS. 5-7.

If a data transmission from a RTF tag is detected, step 415, the interrogator attempts to decode it, step 425. If interrogator 110 fails to decode the data transmission due to one or more errors therein, the processor 122 selects another output power level, which may be higher or lower than the previous output power level, and send a control signal to RF transmitter 130 to adjust magnetic field strength accordingly, step 435. In response, transmitter 130 generates an alternating magnetic field having a different field strength, step 440. Steps 415 through 440 may be repeated for a predetermined time period, a predetermine number of output power levels, or until a data transmission from a proximate RFID tag 160 is detected, decoded and output for further processing, step 445. Once a data transmission from TTF tag or RTF tag has been processed, interrogator 110 may be configured to repeat the interrogation cycle in steps 405 through 445.

As indicated above, in the TTF mode, RFID interrogator 110 is configured to interrogate RFID tags 160 that use one or more variations of the ISO/IEC 14443 standard for contactless IC cards. Depending on the variation used by RFID tag 160, the data transmitted by the tag 160 may be formatted to contain one or more start bits (S), one or more data bits (D), odd (O) or event (E) parity bits and cyclic redundancy check (CRC) bits (C). Below are several examples of bit sequences that interrogator 110 may be able to decode:

S DDDDDDDO DDDDDDDO CCCCCCCO CCCCCCCO (standard ISO/IEC 14443-A bit steam)

DDDDDDDD DDDDDDDD (no start bit, no parity bits, no CRC)

DDDDDDDD DDDDDDDD CCCCCCCC CCCCCCCC (no start bit, no parity bits, CRC)

S DDDDDDDO DDDDDDDO (start bit, odd parity bits, no CRC)

S DDDDDDDE DDDDDDDE (start bit, even parity bits, no CRC)

S DDDDDDDE DDDDDDDE CCCCCCCE CCCCCCCE (start bit, even parity bits, and CRC)

In order to decode these and other bit sequences, the RFID interrogator may use the following decoding algorithm: First, RFID interrogator counts the number of bits in the received bit sequence to see if there is a start bit or not. Second, the interrogator checks each byte to see if there is even, odd or no parity bits. Third, the interrogator checks for the presence of a 16 bit CRC sequence. Once all of these parameters are determined the data is output in the corresponding format. This allows the interrogator to read tags that are fully ISO/EEC 14443 compliant as well as RFID tags that use a TTF variant of the ISO/IEC 14443 communication standard. Each of the above data processing steps will be described in a greater detail hereinbelow with reference to FIGS. 5-7.

Figure 5:
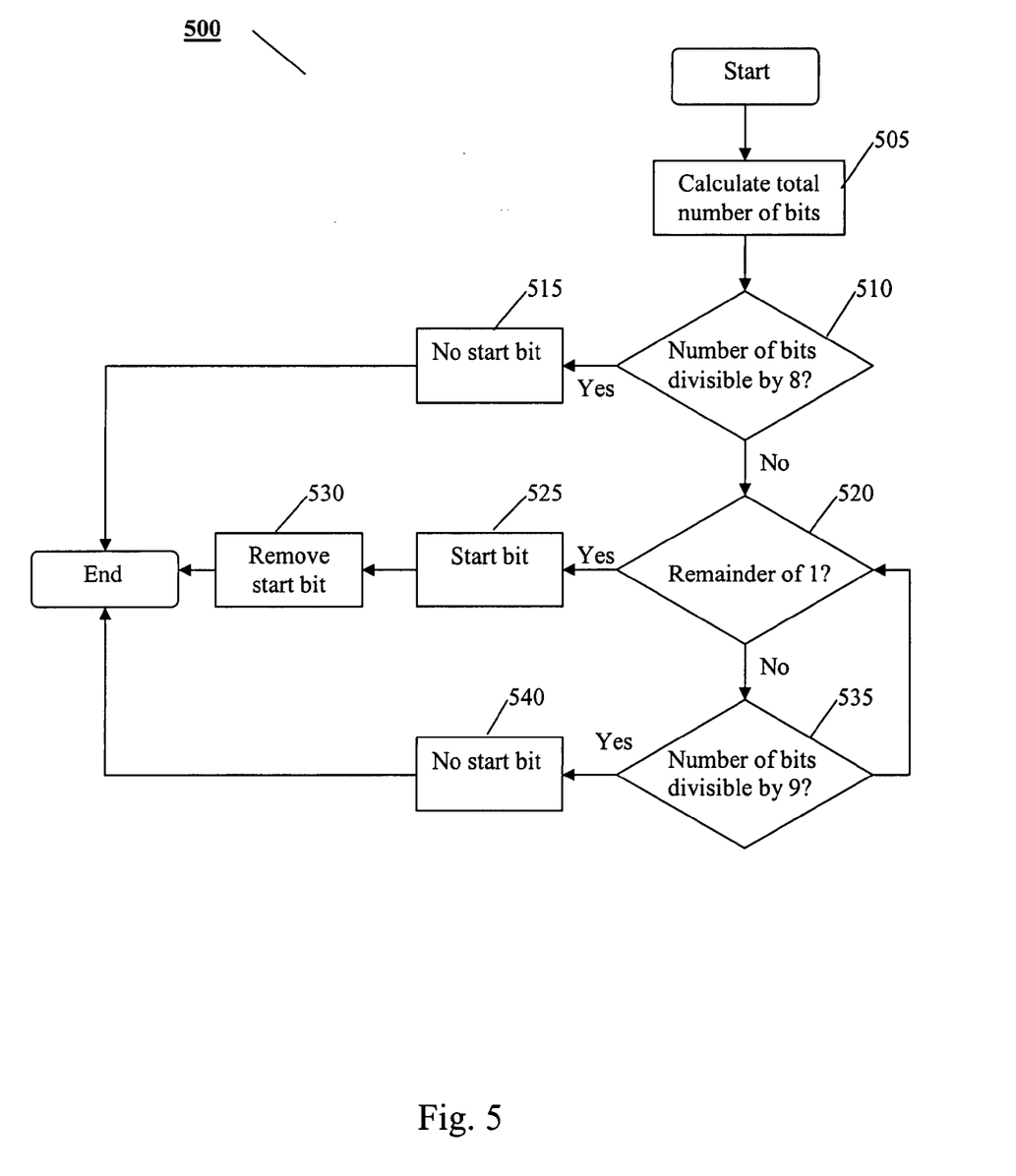
FIGS. 5-7 are flow diagrams illustrating example embodiments of data decoding processes.

Turning now to FIG. 5, an example embodiment of a process 500 for determining the presence of one or more start bits in the RFID data transmission is illustrated in flow diagram form. At step 505, a processor in the RFID interrogator calculates the total number of bits in the received data transmission. The processor then determines if the total number of bits in the data transmission is divisible by 8 without remainder, step 510. If the total number of bits is divisible by eight without remainder, the processor concludes that there is no start bit in the data transmission, step 515. If the total number of bits is divisible by eight with remainder of 1, step 520, the processor concludes that there is a start bit, step 525, and it is removed from the bit sequence, step 330. If the total number of bits is not evenly divisible by eight, step 502, the processor then checks if the total number of bits is evenly divisible by 9, step 535. If the total number of bits is divisible by nine without remainder, the processor concludes that there is no start bit in the data transmission, step 540. If the total number of bits is divisible by nine with remainder of one, step 520, the processor concludes that there is a start bit, step 525, and it is removed, step 530.

The table below illustrates examples of operation of the algorithm of FIG. 5.

| Number of bits | Divisible by 8? | Divisible by 9? | Remainder of 1? | Conclusion |
|---|---|---|---|---|
| 37 | No | No | Yes when divided by 9 | Start bit |
| 36 | No | Yes | Don't care | No start bit |
| 32 | Yes | No | Don't care | No start bit |
| 35 | No | No | No | Erroneous |
| 33 | No | No | Yes when divided by 8 | Start bit |

The following are two examples of operation of the algorithm of FIG. 5.

S DDDDDDDO DDDDDDDO CCCCCCCO CCCCCCCO

Total number of bits received is 37, which does not divide evenly by 8 or by 9. When divided by 9 there is a remainder of 1, therefore the first bit is a start bit.

DDDDDDDO DDDDDDDO CCCCCCCO CCCCCCCO

Total number of bits received is 36, which divides evenly by 9, thus there is no start bit.

Figure 6:
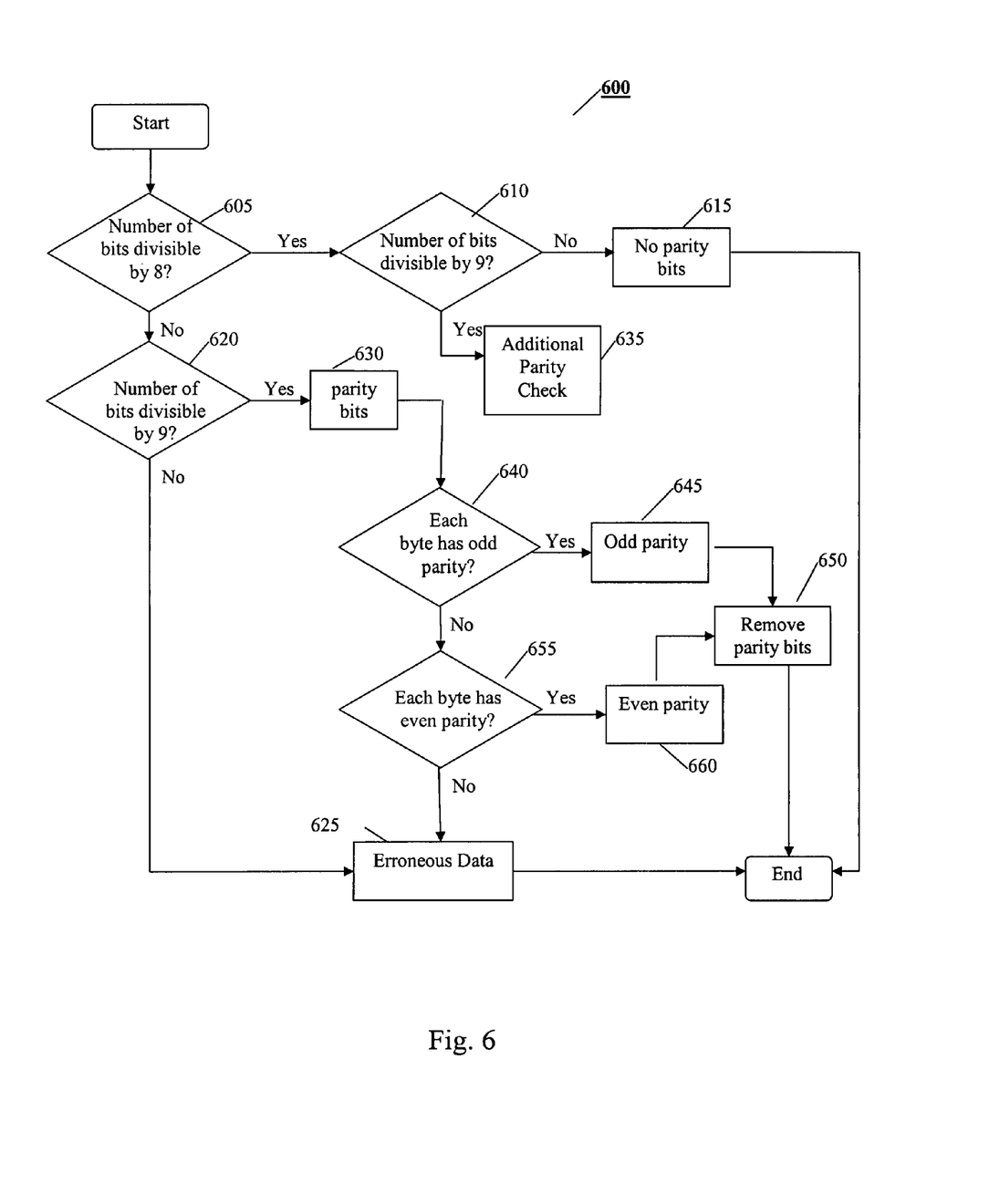

Once the start bit is removed from the bit sequence, the processor may check parity of the data transmission. FIG. 6 shows an example embodiment of a process 600 for determining the parity of the data transmission. For the parity check the number of bits (minus the start bits) is divided by 8 and by 9. If the number of bits divides evenly by 8 and not by 9, steps 605 and 610, the processor concludes that there is no parity, step 615. If the number of bits divides evenly by 9 and not by 8, steps 605 and 620, the processor concludes that there is parity, step 630. If the number of bits divides evenly by 8 and by 9, step 605 and 610, the processor may do additional checking, step 635, as described in the examples below. If the number of bits does not divide evenly by 8 or 9, steps 605 and 620, the data is erroneous, step 625, and may be discarded.

If parity is found, the processor may then check if it is even or odd. In order to do that, the processor checks each byte to see what parity is used. If all bytes use odd parity bits, step 640, the parity is set to odd, step 645, and the parity bits may be removed from the bit sequence, step 650. If all bytes use even parity bits, step 655, the parity is set to even, step 660, and the parity bits may be removed from the bit sequences, step 650. If there is a mix of even and odd parity bits, then the processor concludes that there are one or more bit errors and the data sequence may be discarded, step 625.

The table below illustrates examples of operation of the process of FIG. 6.

| Number of bits | Divisible by 8? | Divisible by 9? | Conclusion |
|---|---|---|---|
| 36 | No | Yes | Has parity bits |
| 32 | Yes | No | No parity bits |
| 72 | Yes | Yes | Additional check needed to determine if there are parity bits |
| 37 | No | No | Erroneous |

The following are three examples of operation of the process of FIG. 6.

DDDDDDDDO DDDDDDDDO CCCCCCCCO CCCCCCCCO
Total number of bits received is 36, which divides evenly by 9 and not by 8, so the processor determines that there is parity. The processor may then check the bit sequence and find all bytes that use odd parity, so that parity is set to odd.

DDDDDDDD DDDDDDDD CCCCCCCC CCCCCCCC
Total number of bits received is 32, which divides evenly by 8 and not by 9, so the processor determines that there is no parity.

DDDDDDDDO DDDDDDDDO DDDDDDDDO DDDDDDDDO DDDDDDDDO DDDDDDDDO CCCCCCCCO CCCCCCCCO
Total number of bits received is 72, which divides evenly by 8 and by 9, so the processor must take every ninth bit of the bit sequence and check it for even and odd parity. In this case every $9^{th}$ bit is found to be an odd parity bit, thus the parity is set to odd.

Figure 7:
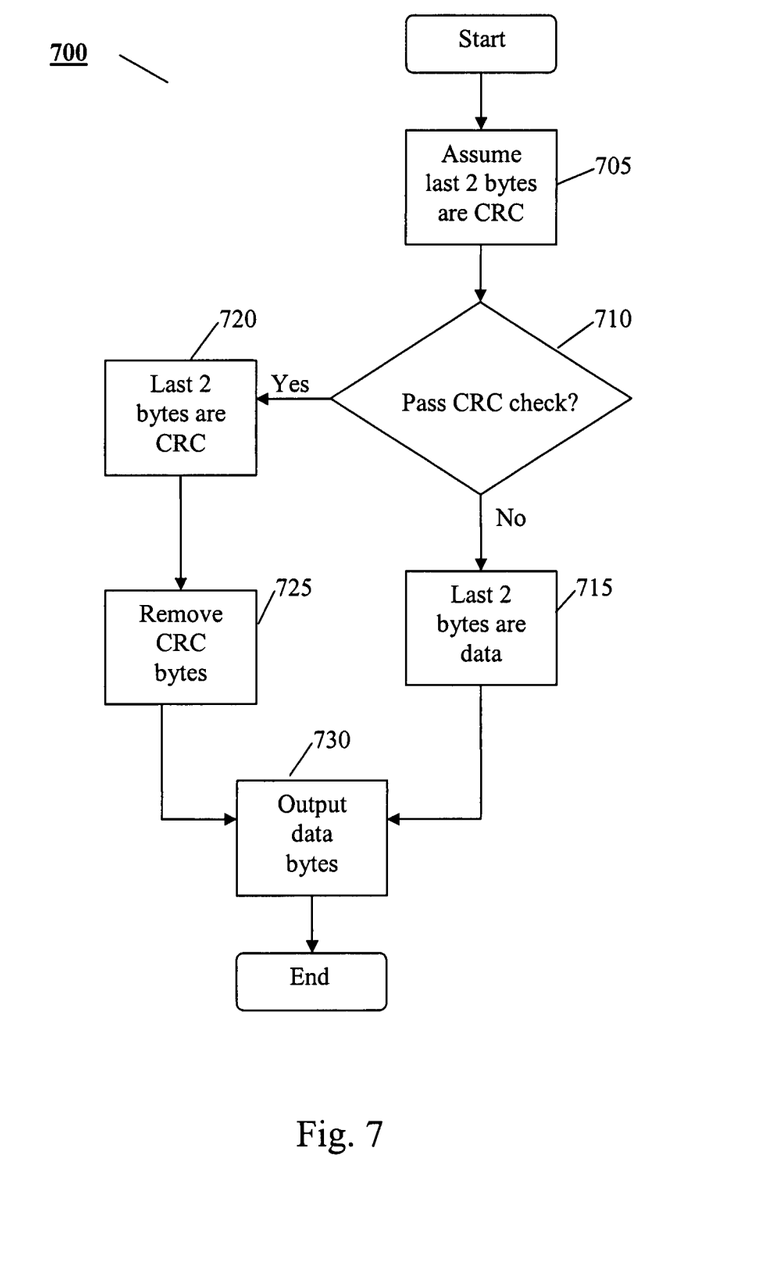

Once one or more parity bits are removed, the processor may determine whether the data transmission includes one or more cyclic redundancy check (CRC) bits. FIG. 7 illustrates an example embodiment of a process 500 for performing a cyclic redundancy check. At step 705, the processor makes an assumption that last 2 bytes of the data transmission are CRC bytes until proven otherwise. The processor then performs a CRC check using methods known to those skilled in the art, step 710. If the CRC completes successfully, then the last 2 bytes are considered to be CRC bytes, step 720. The processor removes the CRC bytes, step 725, and outputs the remaining data bytes containing identification information, step 730. If the CRC does not check out, then the last 2 bytes are considered to be data bytes, step 715, and the processor outputs the remaining data bytes containing identification information, step 730.

The following are two examples of operation of the algorithm of FIG. 7.

DDDDDDDD DDDDDDDD CCCCCCCC CCCCCCCC
The last 2 bytes are assumed to be CRC bytes and a CRC calculation is done. In this case the CRC passes.

DDDDDDDD DDDDDDDD DDDDDDDD DDDDDDDD
The last 2 bytes are assumed to be CRC bytes and a CRC calculation is done. In this case the CRC will fail and the last 2 bytes are taken as data bytes.

In one example embodiment, operating modes and output power levels of interrogator 110 may be configured using a software executed on a computer, which can be connected to the interrogator 110 via an interface (not depicted in FIG. 1), such as a parallel port, serial port or network card. The software may include instructions for selecting a first output power level of the IC card interrogator and selecting a second output power level of the IC card interrogator when the IC card interrogator fails to decode one or more data transmissions from a proximate IC card. The software may also be used to select duration of the first output power level and second output power level. The software may also specify duration of the RTF and TTF modes and other parameter.

Note that cryptographic encoding of identification data stored on the IC may be used in accordance with any of the known standards and processes available to those of skill in the art.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for communicating with contactless IC cards, the method comprising:
generating a first alternating magnetic field for energizing a proximate IC card;
transmitting an IC card polling signal;
receiving a data transmission from the proximate IC card;
storing the received data transmission in a memory and decoding the stored data transmission when the data transmission is not being received in response to the polling signal, wherein the decoding includes determining the format of the stored data transmission, which, in turn, includes:
determining whether the data transmission includes one or more start bits;
determining whether the data transmission includes one or more parity bits; and
determining whether the data transmission includes one or more cyclic redundancy check (CRC) bits;
determining whether or not the data transmission is being received in response to the polling signal, which includes determining whether the data transmission was received before or after expiration of a predetermined time period following transmission of the polling signal;
attempting to decode the data transmission being received when the data transmission is being received in response to the polling signal;
generating a second alternating magnetic field when failing to decode the data transmission being received, the second alternating magnetic field having different magnetic field strength than the first alternating magnetic field;
keeping a count corresponding to the attempt to decode data transmissions following the first alternating magnetic field;
alternating between generating the first alternating magnetic field and generating the second alternating magnetic field as a function of the count corresponding to the attempt to decode data transmissions; and
attempting to decode a data transmission being received from the proximate IC card following generation of the second alternating magnetic field.

2. The method of claim 1, wherein the first alternating magnetic field is stronger than the second alternating magnetic field.

3. The method of claim 1, wherein the first alternating magnetic field is weaker than the second alternating magnetic field.

4. Logic encoded in one or more non-transitory computer readable media for execution and when executed operable to:
generate a first alternating magnetic field for energizing a proximate IC card;
transmit an IC card polling signal;
receive a data transmission from the proximate IC card;
store the received data transmission in a memory and decode the stored data transmission when the data transmission is not being received in response to the polling signal, wherein the decoding includes determining the format of the stored data transmission, which, in turn, includes:
determining whether the data transmission includes one or more start bits;
determining whether the data transmission includes one or more parity bits; and determining whether the data transmission includes one or more cyclic redundancy check (CRC) bits;

determine whether or not the data transmission is being received in response to the polling signal, which includes determining whether the data transmission was received before or after expiration of a predetermined time period following transmission of the polling signal;

attempt to decode the data transmission being received when the data transmission is being received in response to the polling signal;

generate a second alternating magnetic field when failing to decode the data transmission being received, the second alternating magnetic field having different magnetic field strength than the first alternating magnetic field;

keep a count corresponding to the attempt to decode data transmissions following the first alternating magnetic field;

alternate between generating the first alternating magnetic field and generating the second alternating magnetic field as a function of the count corresponding to the attempt to decode data transmissions; and attempt to decode a data transmission being received from the proximate IC card following generation of the second alternating magnetic field.

\* \* \* \* \*